No. 715,813.  
W. E. KARNS.  
INSULATED RAIL JOINT.  
(Application filed June 10, 1902.)  
Patented Dec. 16, 1902.
(No Model.)
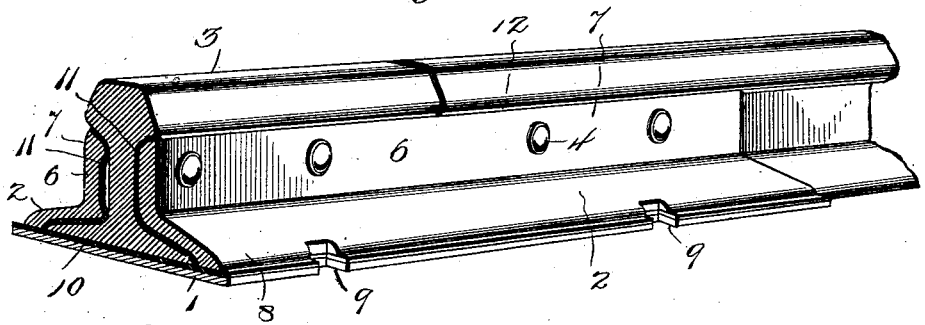
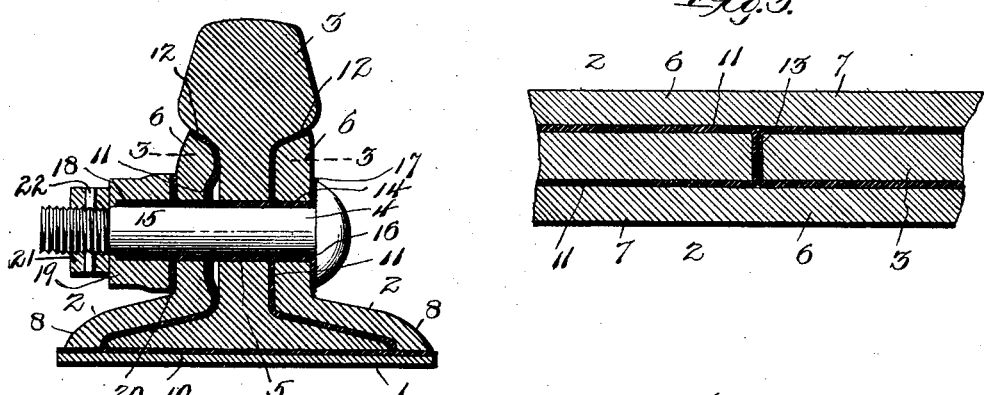
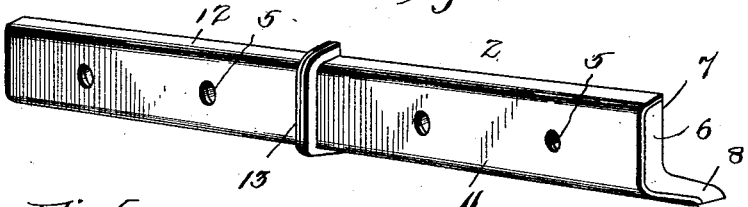
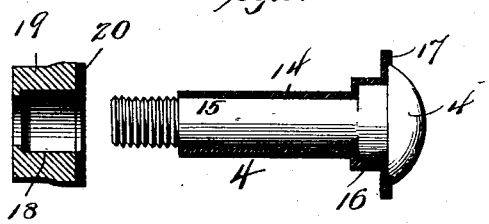
Witnesses  
Inventor  
William E. Karns.  
Attorney

UNITED STATES PATENT OFFICE.

WILLIAM ELLIOTT KARNS, OF PARKERS LANDING, PENNSYLVANIA.

INSULATED RAIL-JOINT.

SPECIFICATION forming part of Letters Patent No. 715,813, dated December 16, 1902.

Application filed June 10, 1902. Serial No. 111,059. (No model.)

*To all whom it may concern:*

Be it known that I, WILLIAM ELLIOTT KARNS, a citizen of the United States, residing at Parkers Landing, in the county of Armstrong and State of Pennsylvania, have invented certain new and useful Improvements in Insulated Rail-Joints, of which the following is a specification.

This invention relates to electrical-conductor insulators, and more particularly to the insulation of railway-track rails employed as conductors in electrical railways or electrical signaling systems, wherein it is necessary at certain points to provide a thorough and effective insulation of the joints of contiguous rails.

To this end the invention contemplates a simple and practical construction of insulated rail-joint comprising a permanent mounting of the insulation or insulating material and an effective distribution thereof to provide a thoroughly-insulated joint and positively prevent the passage of electricity therethrough.

A further object in this connection is to provide the different elements or instrumentalities constituting the joint with insulation or insulating material constituting an intimate and for practical purposes an integral part thereof, whereby the entire joint may be taken apart and set up without any possibility whatever of disturbing the arrangement of the insulation.

Another object of the invention is to provide for such an insulation of the contacting faces of the different elements of the rail-joint as to permit of said joint accommodating itself to the usual contraction and expansion without disturbing the insulated character of the joint; and with this in view the invention provides not only a complete insulation for the base-plate and fish-plate members of the joint, but also for the joint or fish-plate bolts and the different elements of such bolts.

With these and many other objects in view, which will more readily appear as the nature of the invention is better understood, the same consists in the novel construction, combination, and arrangement of parts, as will be hereinafter more fully described, illustrated, and claimed.

The essential feature of the invention involved in the provision of a permanent insulation for the contacting faces of the different members of the rail-joint and the novel manner of effecting a permanent insulation between the contiguous ends of the rails are necessarily susceptible to some modification without departing from the invention; but a preferred embodiment of the latter is shown in the drawings, in which—

Figure 1 is a perspective sectional view of a rail-joint insulated in accordance with the present invention. Fig. 2 is an enlarged transverse sectional view of the joint, the line of section including one of the joint or fish-plate bolts. Fig. 3 is a horizontal sectional view on the line 3 3 of Fig. 2, the line of section including the contiguous or adjacent ends of separate rails, showing the provision for maintaining a thorough insulation at this point. Fig. 4 is a detail perspective of the inner side of a fish-plate having a permanent insulated sheath such as contemplated by the present invention. Fig. 5 is an enlarged detail sectional view of one of the joint or fish-plate bolts and the washer thereof, showing the insulated sheath such as provided for by the present invention. Fig. 6 is a detail view of the character of insulating material preferably employed.

Like reference characters designate corresponding parts throughout the several figures of the drawings.

In carrying out the invention no special change is required in the usual construction of rail-joints, as the improvement may be applied to any form or construction of rail-joint such as utilized in connection with rails designed as conductors in electric railways or signaling systems. Hence for illustrative purposes in the drawings there is shown an ordinary form of rail-joint essentially comprising in its organization the flat metallic base-plate 1, the oppositely-disposed fish-plates 2, arranged, respectively, upon opposite sides of the rail 3, and the joint or fish-plate bolts 4, passing through the registering bolt-holes 5 in the web of the rails and the vertical body portion 6 of the fish-plates. In the ordinary types of rail-joints, constructed as shown in the drawings, the fish-plates 2 essentially consist of the upright clamping members 7 and the outturned base-flanges 8, fitting over the base-flange of the rail and having at their edges the usual spike-notches 9 for receiving the spikes that are also passed through corresponding notches in the edges of the flat metallic base-plate.

To provide a thorough insulation for the entire rail-joint throughout the extent thereof, it is necessary to distribute this insulation over all metallic faces of the joint which would ordinarily contact and complete an electrical circuit. This is of course recognized in the art, and insulation has been applied in various ways to accomplish the desired result; but a distinctive feature of the present invention consists in providing the faces or surfaces of the different members of the joint which lie next to the rail with a permanent insulating-sheath, which forms a nonseparable and rigid part of the rail-joint members to which it is applied, so that said rail-joint members may be mounted in position or taken from the joint without displacing or dislodging its insulation.

It is preferable in the carrying out of the invention to employ insulating material consisting of hard rubber and canvas-duck thoroughly vulcanized together, with the canvas-duck embedded in the rubber, as plainly shown in detail, Fig. 6 of the drawings, in which is illustrated a section of the preferred insulating material and is designated in its entirety by the reference-letter I, with the reference-letters R and C designating, respectively, the rubber and canvas-duck constituents of the composition material. To provide the several detachable members of the rail-joint with a permanent insulating-sheath of the insulating material I, such insulating material is vulcanized directly to and on the face of the rail-joint member to be insulated thereby, thus effecting a rigid and intimate union between the insulating-sheath and the joint member carrying the same.

The insulating-sheath for the base-plate of the rail-joint is in the form of a facing 10, covering the entire upper surface area of the base-plate and vulcanized thereto, as already explained. Likewise the insulating-sheath for each of the opposite fish-plates 2 consists of a facing 11, covering the entire inner surface area of the fish-plates and also vulcanized thereto. The insulating sheath or facing 11 for the inner face of each of the fish-plates 2 not only entirely covers the vertical clamping and base members 7 and 8 of the fish-plates, but also has a capping portion 12 extended over the rounded top edge of the fish-plate, so as to be interposed between such portion of the fish-plate and the under side of the tread of the rail.

Another distinctive feature of the present invention consists in providing the insulating sheath or facing 11 of each fish-plate, at a point intermediate the ends of the latter, with an inwardly-projecting separating fin 13, offset materially from the inner side or face of the fish-plate and adapted to project well into the space or interval between the adjacent rail ends and combining with the corresponding fin of the opposite fish-plate sheath to produce a complete insulating filling between the rail ends that effects a thorough insulation at this point at all times irrespective of the contraction and expansion of the rail. The separating-fin 13 of insulating sheath or facing of each fish-plate is made perfectly rigid through the operation of vulcanization and is preferably shaped by producing a transverse crimp in the sheath or facing. By reason of forming the fin through a crimping of the insulating sheath or facing it will be obvious that an extra thickness of fin is formed, as plainly shown in Fig. 3 of the drawings. In the construction shown in the drawings the insulating sheath or facing 11 is illustrated as consisting of separate pieces or sections having their contiguous meeting ends vulcanized together and crimped outward to form the fin 13. This makes a very strong and durable construction, besides insuring thorough insulation.

To carry out the complete insulation of the joint, it is necessary that each of the joint or fish-plate bolts 4 be completely insulated from metallic contact with the rail. To effect this, the insulating-sheath for each bolt consists of an insulating jacket-sleeve 14, incasing the greater portion of the bolt-stem 15 and formed at one end with a collar portion 16, having an outturned facing-flange 17, covering the entire shoulder at the inner side of the bolt-head and of greater diameter than the latter. The end of the insulating jacket-sleeve 14 opposite its facing-flange 17 terminates short of the threaded extremity of the bolt but is designed to extend into the counterbored socket 18, formed in one side of the bolt-washer 19.

The inner side of the washer has vulcanized thereto a sheath or facing 20 of the insulating material, which contacts with the fish-plate opposite the one engaged by the facing-flange 17 of the bolt-head. It is of course understood that the insulating sheath or jacket for the bolt is permanently vulcanized thereto. The construction described in connection with the bolt is very advantageous inasmuch as the disposition of the jacket-sleeve 14 with reference to the counterbore of the bolt-washer permits the bolt to pass into the washer, so as to admit of a tightening of the plates without interfering with the insulation.

Each bolt necessarily includes as an essential element thereof the threaded nut 21, turning on the threaded extremity of the bolt-stem and binding against the outer side of the bolt-washer 19. In order to render the rail-joint thoroughly complete in every respect, it is preferable to associate with the nut 21 of each bolt suitable expedients for locking the same against movement after having been tightened up and screwed home. In other words, the invention is designed to have associated therewith a suitable nut locking or fastening means. While various expedients may be resorted to for effecting a locking of the nut 21 and different types of nut-locking devices may be utilized, still a simple and preferable means is shown in the drawings and simply consists in providing each bolt-nut 21 with a transversely-disposed tool-receiving opening or openings 22, intersecting the threaded bore of the nut and adapted to receive therein a suitable punch or upsetting tool which is adapted to be placed against the bolt-threads exposed through the openings 22 and to be given a sharp blow, whereby the threads of the bolt-stem are upset or destroyed, thus effecting a permanent and positive locking of the nut.

From the foregoing is thought that the construction and many advantages of the herein-described means for insulating a rail-joint will be readily apparent without further description, and it will also be understood that various changes in the form, proportion, and minor details of construction may be resorted to without departing from the spirit of the invention or sacrificing any of the advantages thereof.

Having thus described the invention, what is claimed, and desired to be secured by Letters Patent, is—

1. In an insulated rail-joint, a sheath of insulating material vulcanized directly to the rail adjoining faces of the several detachable members constituting the joint.

2. In an insulated rail-joint, of an insulating-sheath of hard rubber and canvas vulcanized directly to the rail adjoining faces of the several separable members of the joint.

3. In an insulated rail-joint, the combination with the base-plate, the fish-plates and the joint-bolts, of an insulating-sheath vulcanized to the upper face of the base-plate, a similar sheath vulcanized to the inner face of each fish-plate and capping the rounded top edge thereof and extending throughout the entire inner surface area of the same, and similar sheaths vulcanized to the bolt and the binding-faces thereof.

4. In an insulated rail-joint, the combination with the fish-plates, of an insulating-sheath vulcanized to the inner face of each fish-plate and having an inwardly-projecting fin extending into the space between the joint ends.

5. In an insulated rail-joint, the combination with the fish-plates, of an insulating-sheath vulcanized directly to the inner face of each fish-plate and having a transversely-crimped portion producing a laterally-offset separating-fin for the rail ends.

6. In an insulated rail-joint, the combination with the fish-plates, of an insulating-sheath vulcanized to the inner face of each plate and consisting of separate sections having their adjacent ends vulcanized together and crimped outward to produce an offset separating-fin for the rail ends.

7. In an insulated rail-joint, the combination with the fish-plates, of the joint-bolts each having a washer provided at its inner side with a counterbored socket, an insulating jacket-sleeve incasing the bolt-stem and having at one end a facing-flange of greater diameter than the bolt-head and facing the shoulder at the inner side thereof, the opposite end of said jacket-sleeve being adapted to take into the counterbore of the washer, and an insulating-sheath facing the inner face of the washer.

In testimony whereof I affix my signature in presence of two witnesses.

WILLIAM ELLIOTT KARNS.

Witnesses:
CURTIS B. HENRY,
ROBT. BALPH.